Figure 1:
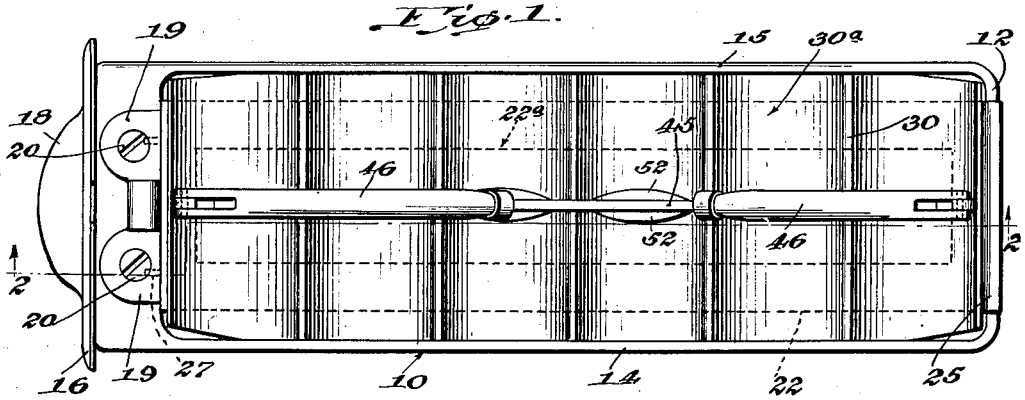

June 9, 1936. M. K. BUCHANAN ET AL 2,043,881
ICE CUBE PAN
Filed July 25, 1933  2 Sheets-Sheet 1

WITNESSES

INVENTORS
M. K. Buchanan and
BY A. G. Horton
ATTORNEYS

June 9, 1936. M. K. BUCHANAN ET AL 2,043,881
ICE CUBE PAN
Filed July 25, 1933  2 Sheets-Sheet 2
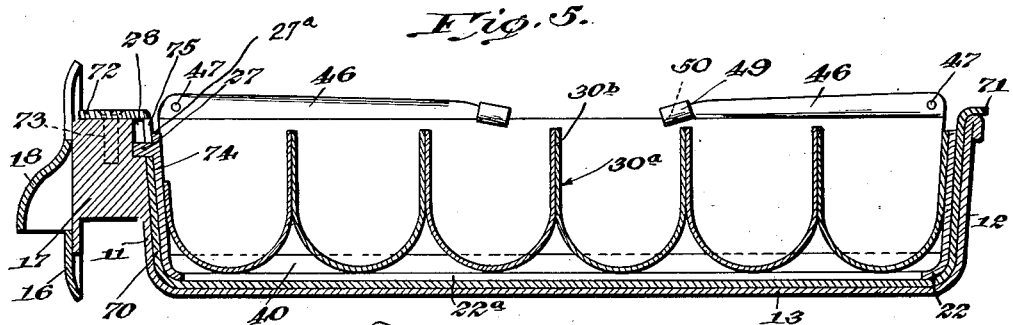
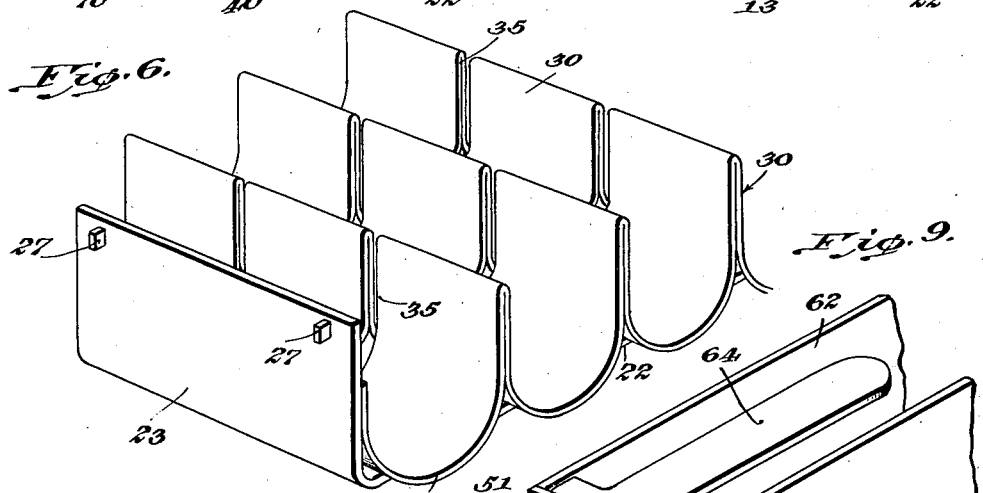
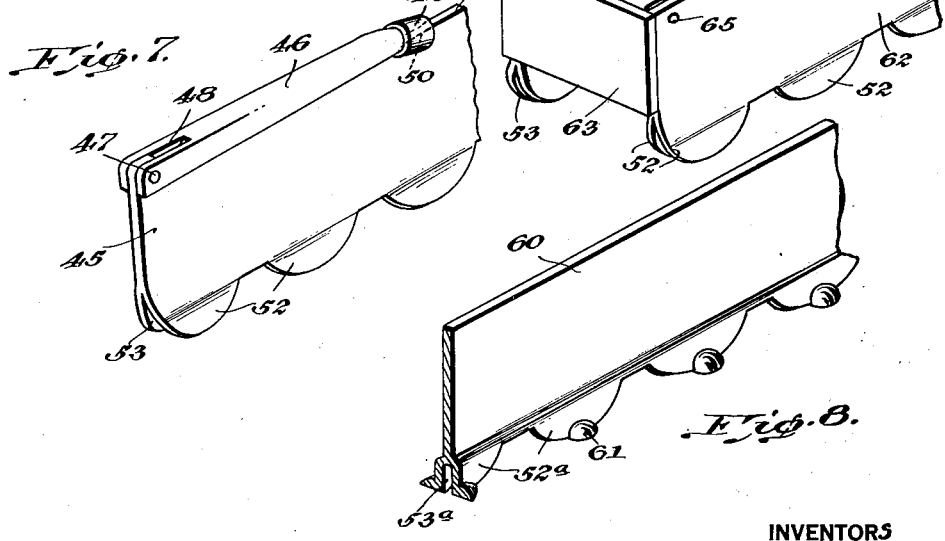

Patented June 9, 1936

2,043,881

UNITED STATES PATENT OFFICE 2,043,881

ICE CUBE PAN

Michael K. Buchanan and Albert G. Horton, Norfolk, Va.

REISSUED
JUL 2 2 1941

Application July 25, 1933, Serial No. 682,157

17 Claims. (Cl. 62—108.5)

This invention relates to an ice cube pan.

An object of the invention is the provision of an ice cube pan having therein a plurality of grid members movable relative to each other with one of the grid members having a limited outward movement from the pan, the other grid member being removable from the first-mentioned grid member with means for moving the grid members a limited distance outwardly of the pan when the ice cubes are frozen to the grid member for breaking the ice cubes loose from the pan, the means for raising the grid members being further actuated for causing the last-mentioned grid members to be moved away from the first-mentioned grid member for breaking the cubes loose from said grid member.

Another object of the invention is the provision of an ice cube pan in which is mounted a grid member having a limited outward movement from the pan with a second grid member being removable from the grid member in the pan, the grid members being connected together and to the pan by the cubes frozen in the grid members in the pan, means being employed for raising the removable grid member which will cause the first-mentioned grid member to be moved through a limited distance outwardly of the pan while continued movement of the actuating means causes the removable grid member to be lifted out of the first-mentioned grid member so that the cubes during the entire operation of the lifting means will cause breaking of the cubes loose from the pan in the grid members.

A further object of the invention is the provision of an ice cube pan in which are mounted a plurality of grid members co-operating to form ice cube molds, one of the grid members being so connected to the pan that it will have a limited outward movement while the other grid member is removable from the first-mentioned grid member and the pan, means being connected with the removable grid member for raising the same out of the first-mentioned grid member and from the pan in such a manner that the grid member having a limited movement will be moved a predetermined distance for releasing the cubes from the walls of the pan, the continued raising of the removable grid member causing the cubes to be broken loose from the grid members, a reenforcing liner being located upon the bottom and in engagement with the end walls of the pan and having lips acting as a fulcrum when engaged by the lifting means.

This invention will be best understood from a consideration of the following detailed description, in view of the accompanying drawings forming a part of the specification; nevertheless, it is to be understood that the invention is not confined to the disclosure, being susceptible of such changes and modifications which shall define no material departure from the salient features of the invention as expressed in the appended claims.

Figure 2:
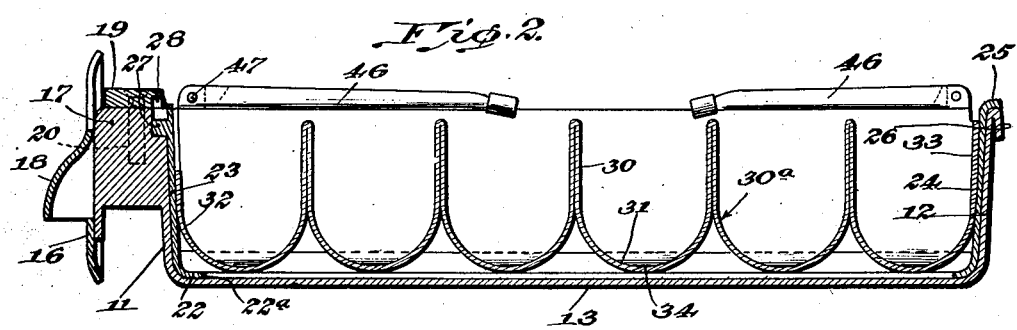
Figure 3:
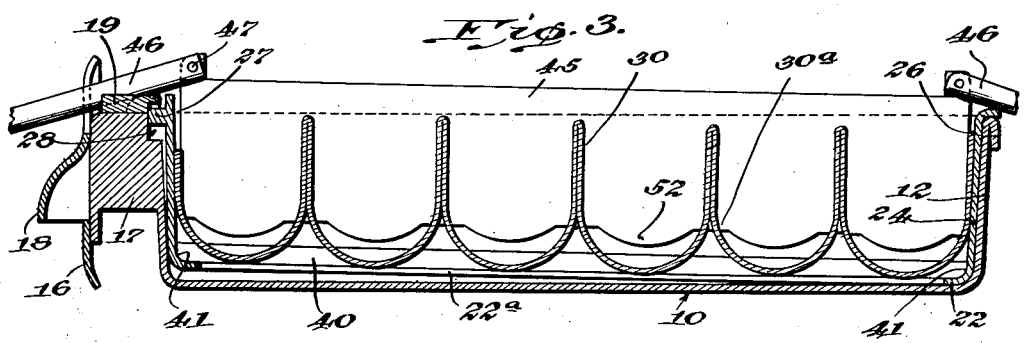
Figure 4:
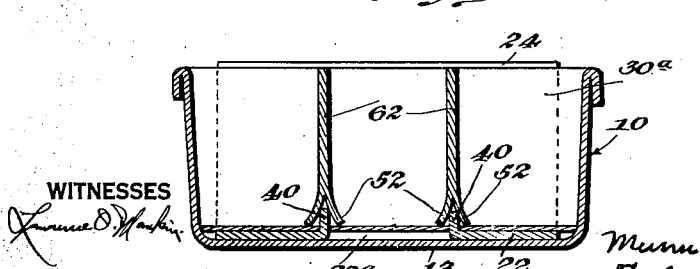

In the drawings:

Figure 1 is a plan view of an ice cube pan constructed in accordance with the principles of our invention, Figure 2 is a longitudinal vertical section taken along the line 2—2 of Figure 1 showing the grids in position, Figure 3 is a similar longitudinal vertical section showing the grids elevated for breaking the cubes loose from the pan and the grid, Figure 4 is a transverse vertical section of a modified form of the invention, Figure 5 is a longitudinal vertical section of a further modified form of the ice cube pan.

Figure 6 is a fragmentary view in perspective of the grid member adapted for use with a plurality of longitudinally disposed walls, Figure 7 is a fragmentary view in perspective of the longitudinally disposed grid member shown in Figs. 1 to 3, inclusive, Figure 8 is a fragmentary view in perspective of a modified form of the grid member shown in Figure 7, and Figure 9 is a fragmentary view in perspective of the modified form of grid member used in connection with the grid member shown in Fig. 6.

Referring more particularly to the drawings, 10 designates an ice cube pan having end walls 11 and 12, a bottom 13 and side walls 14 and 15. A finishing plate 16 is secured to a reinforcing block 17 which is secured to or formed integrally with the end wall 11. The finishing plate 16 is provided with a lip 18 which is adapted to be grasped by the fingers for removing the ice cube pan from the refrigerator.

A reenforcing block 19 is secured in any approved manner, as shown at 20, to the reenforcing member 17.

Located within the pan 10 is a grid member which includes a reenforcing base member 22 which lies in flat contact with the base member 13 of the pan. The member 22 is provided with vertical extensions 23 and 24 which extend upwardly and are in flat contact with the adjacent end walls of the pan. The extension 24 is provided with a lip 25 which extends over a re-turned flange 26 at the upper end of the end wall 12.

Spaced lugs 27 are secured to the outer face of the extension 23 of the base member 22 and these lugs project into spaced slots 28 which pass through the adjacent end wall of the pan 10 and into the reenforcing member 17. Where the reenforcing member 17 is formed integrally with the end wall 11 of the pan the slots 28 are cut directly into the reenforcing member. On the other hand where the reenforcing member 17 is formed separately from the pan and secured thereto the slots 28 are formed in the end wall and the reenforcing member.

A sheet of flexible material is bent at intervals to provide transverse walls 30 and rounded bottom portions 31. The bent portion which forms the walls 30 are secured together in any approved manner. One end of the strip of metal which has been bent to form the walls 30 is secured at 32 to the vertical extension 23. The opposite end of the strip of material, as shown at 33, is secured to the extension 24. The rounded portion 31 is secured at 34 to the base member 22. It will be noted that the base member 22 and the extensions 23 and 24 are of less width than the pan and likewise the transverse partitions or walls 30.

Each of the partitions or walls 30 are provided with vertical slots 35 and these slots extend downwardly and into the rounded portions 31 for a purpose which will be presently explained.

A reenforcing strip 40 is secured to the base member 22 along its lower edge and has its ends as shown at 41 secured to the extensions 23 and 24. The reenforcing member 40 passes through the inner ends of the vertical slots 35 and also passes through the end portions 32 and 33.

A movable grid member is shown more particularly in Fig. 7 and consists of a metal bar 45 having a lever 46 pivotally connected at its upper end and near the upper edge as shown at 47. The lever is bifurcated at 48 and cut away to receive the upper end of the plate 45 which forms the second grid member. The lever is provided with a finger piece 49 which is likewise grooved at 50 so that it will neatly rest upon the upper edge 51 of the plate or wall 45.

The lower edge of the plate or wall 45 is provided with flared lips or flanges 52 so that a space 53 is provided between a pair of lips located upon opposite faces of the plate 45 to receive the reenforcing member 40 and these lips, as shown in Figure 1, extend outwardly from the plate or wall 45 and form projections upon which the ice cubes rest so that when the plate or grid member 45 is elevated these lips will aid in raising the cubes from the pan. Because of the wedging action of the flanges 52 the cubes will be forced outwardly towards the side walls of the pan and away from the partition or grid member 45. These flanges in effect form inclined walls at the opposite faces and adjacent the lower edge of said partition.

A modified form of the plate is shown at 60 in Figure 8. In this form the lips 52ª are located in vertical plates and spaced from each other to provide a groove 53ª to receive the reenforcing bar 40. Semi-spherically-shaped beads 61 are formed at the lower ends of the lips and these beads provide a lifting surface or a support for the cubes. The plate 60 is also provided with levers 46 for raising the grid or plate from the grid containing the transverse walls 40.

Figure 6 shows a substantially stationary grid member which is similar in all respects to the grid member shown in Figs. 1 to 3, inclusive, except that the transverse walls 30 are extended sufficiently to provide a pair of slots 35, thereby increasing the number of ice cube cells in the pan.

In Fig. 4 is shown a transverse section of the pan containing the grid for increasing the number of cells over those shown in Figs. 1 to 3, inclusive.

The movable grid member which is adapted to be employed in connection with the grid shown in Figs. 4 and 6 is disclosed in Fig. 9 and contains a pair of plates or walls 62 with their plates 63 connecting the walls 62 together. A lever 64 is pivoted at 65 between the opposite ends of the walls 62 and adjacent the reenforcing plate 63. Each of the plates 62 is provided with lips 52 having a slot 53 therebetween which is adapted to receive the reenforcing bars 40 which in this instance will be two in number. In other words, where larger pans are employed there will be a greater number of cells and the number of cells is controlled by the number of division plates or walls 62 as shown in Fig. 9.

In the modified form shown in Fig. 5, the reenforcing member 70 is employed which forms a liner for the bottom 13 and end walls 11 and 12 of the pan. This liner rests upon the bottom 13 and in flat contact with the end walls 11 and 12 of the pan. One end of the liner, as shown at 71, is provided with an inturned flange which engages over the top of the end wall 12. The opposite end of the liner is provided with a flange 72 which is brought over the top of the reenforcing member 17 and secured to the reenforcing member in any approved manner as shown at 73. One end wall 74 of the liner is provided with slots 75 into which the lugs 27 project. The transverse walls 30ᵇ are in contact with each other but are not connected together at their upper edges so that these walls are movable relative to each other and are so moved when the cubes are forced from the grid members.

The operation of our device is as follows: Water is placed in the pan after the grids have been placed in position and placed in the refrigerator. As soon as the water is frozen the pan is removed and the levers 46 are raised and moved outwardly over the end walls of the pan. As shown in Figs. 1 to 3, inclusive, the outer ends of the levers are forced downwardly with the block 19 and the lip 25 acting as a fulcrum. When a slight pressure is placed on the ends of the levers both of the grid members which are locked together by the frozen cubes will be raised as a unit through a distance which is permitted by the slots 28 and the levers 27. Said levers in Figs. 1 to 3, inclusive, will engage the free edge 27ª of the extension of the base member of the relatively stationary grid member and this edge acts as a cam or fulcrum in the initial stages of separating the grid members so that the relatively stationary grid member is held against movement while the grid member 45 is being moved outwardly of its nested position within the other grid member. When this happens the ice cubes are broken loose from the side walls of the pan. Further movement of the levers will cause the movable grid member 45 to be moved outwardly from the limited grid member and cause the cubes to be broken from the grid members so that the cubes may be readily lifted from the grid members in the pan.

It will be seen by this construction that the slight movement of the relatively stationary grid member, designated by the numeral 30ª, will release the cubes from the pan while retaining the grid members locked together until the levers 46 are operated sufficiently to cause the movable grid member 45 to break the cubes loose from the grid members.

The operation of the device shown in Figs. 4 and 6 with the additional ice cube cells will be substantially the same as the operation of the device shown in Figures 1 to 3, inclusive.

In the construction shown in Fig. 5, the reenforcing flange 72 on the liner 70 and the flange 71 will act as fulcrums for the levers 46 so that the strain incidental to breaking the cubes loose will be exerted upon the liner and not upon the pan.

The grid member 60 is provided with rounded projections 61 which when one end of the grid member is tilted will tend to revolve in the pockets formed in the ice cubes where these projections are located when the grid member is being raised.

The transverse walls as have been previously described have a slight movement relative to each other when the cubes are forced out of the pan and this movement facilitates the removal of the cubes because of the fact that the slight movement of the transverse walls tends to shift the cubes when the second grid member is being elevated from the other grid member. This movement has the same effect as if the transverse walls were tapered from the inner ends at the plate 45 to the outer ends.

The base members 22 in all of the forms are provided with elongated slots 22ª so that it will be possible to readily clean the outer surfaces of the rounded portions 31 of the cells when desired. The opposite ends of the rounded portions 31 of the cells are secured to the metal of the base members located at each side of the slots 22ª.

As shown in Fig. 4 the metal of the base member 22 at each side of the slot 22ª is bent upwardly to form the reenforcing bars 40.

In all of the forms it will be readily apparent that when the grid members are locked together by the ice cubes that the initial movement of either lever or both levers will cause the frozen cubes to be broken loose from the inclined side walls of the pan and when the grid members have been raised sufficiently to break the cubes loose the side walls of the cubes will be slightly spaced from the side walls of the pan. In this initial movement the lever 46 will be in engagement with an end of the pan so that further outward rocking movement of the lever will cause the lever to engage the edge 27ª of the extension of the grid member having the transverse walls so that the edge 27ª will act as a cam for preventing further upward movement and being engaged by the lever 46 will act as a cam or fulcrum to prevent further upward movement of the grid member having transverse walls regardless of the cooperating stops 27 and 28 and therefore the last-mentioned grid will at this time be retained against further upward movement while the grid member 45 may be elevated to the position shown in Fig. 3. This action of the lever at this time upon the free edge 27ª of the extension will tend to move the grid member having transverse walls downwardly while the grid member 45 is moved upwardly and the cubes are broken away from the grid members. The continued rocking of the levers 46 will further elevate the cubes which are now in a free state and may be readily removed either by hand or by the tilting of the pan.

The wedge-shaped faces of the flanges 52 when the grid 45 is being moved upwardly from the other grid will tend to shift the cubes towards the inclined side walls of the pan and these inclined side walls will tend to force the cubes laterally, thereby facilitating the breaking of the cubes from the grid members.

We claim:

1. An ice cube pan having a relatively stationary grid member, a movable grid member cooperating with the relatively stationary grid member to form ice cube cells, means for raising the movable grid member to break the ice cubes loose from the pan and grid members, co-operating means on the pan and relatively stationary grid member to provide for a slight outward movement of the relatively stationary grid member when the raising means is actuated, the cooperating means retaining the relatively stationary grid member from further movement while the movable grid member is forced outwardly from the relatively stationary grid member.

2. An ice cube pan having a relatively stationary grid member, a movable grid member, means for raising the movable grid member to break the ice cubes loose from the pan and the grid members, co-operating means on one end of the relatively stationary grid member and an end wall of the pan to provide for limited outward movement of the first-mentioned grid member when the raising means for the movable grid member is initially actuated.

3. An ice cube pan having a relatively stationary grid member, a movable grid member, means for raising the movable grid member to break the ice cubes loose from the pan and the grid members, co-operating means on one end of the first-mentioned grid member and an adjacently disposed end wall of the pan and including slots and lugs to provide for limited outward movement of the first grid member when the raising means for the movable member is initially actuated.

4. In an ice cube pan, a grid having a plurality of relatively stationary walls and a plurality of normally movable walls, means for connecting the first-mentioned walls to an end wall of the pan to provide for a limited outward movement of the first mentioned walls, and means for raising the movable walls and the first-mentioned walls through a limited movement for breaking the ice cubes loose from the pan and the walls.

5. In an ice cube pan, a grid having a relatively stationary grid member and a normally movable grid member, means for raising said normally movable grid member, means for loosely connecting one end of the first-mentioned grid member with an end wall of the pan to provide for a limited outward movement of the first grid member during the initial actuation of the raising means.

6. In an ice cube pan, a plurality of grid members movable relative to each other, means for limiting movement of one of the grid members, and means for raising the other grid member from the first-mentioned grid member while causing limited movement of said first-mentioned grid member for breaking the ice cubes loose from the grid members and pan.

7. In an ice cube pan, a plurality of grid members movable relative to each other and to the pan, and means for causing relative movements between the grid members and the pan and relative movements between the grid members for breaking the ice cubes loose from the pan and grid members.

8. In an ice cube pan, a plurality of grid members movable relative to each other, one of the grid members having walls formed of flexible material so that said walls may be moved relative to the walls of the other grid member when the other grid member is moved outwardly from the first-mentioned grid member and means for moving both of the grid members relative to the pan and then the second-mentioned grid member relative to the first-mentioned grid member and the pan for breaking the ice cubes loose from the pan and grid members.

9. In an ice cube pan, a plurality of grid members movable relative to each other, one of said grid members having walls formed of flexible material so that said walls may have a movement relative to the walls of the other grid member, means for limiting outward movement of the first-mentioned grid member, means for moving the grid members outwardly of the pan until the limiting means prevents further movement of the grid members for breaking the cubes from the pan, further actuation of the moving means causing the second-mentioned grid member to be moved away from the first grid member for breaking the cubes loose from the grid members.

10. In an ice cube pan, a reenforcing member forming a liner for the bottom and end walls of the pan, means for securing one end of the liner to an end wall of the pan, a plurality of grid members movable relative to each other, one of the grid members having limited upward movement in the pan and resting on the liner, the other grid member being movable away from the first-mentioned grid member.

11. In an ice cube pan, a reenforcing member forming a liner for the bottom and end walls of the pan, said liner at each end having a lip extending over an adjacent end wall of the pan, means for securing a lip to one end wall, a plurality of grid members in the pan, one of the grid members resting on the liner, a lever pivotally connected to each end of the other grid member, the last-mentioned grid member being movable from the first-mentioned grid member, the lips on the liner acting as fulcrums for the levers when said levers are actuated to force the last-mentioned grid member from the first-mentioned grid member for breaking the cubes loose from the pan and grid member.

12. In an ice cube pan, a grid having a plurality of transverse walls, a second grid member having a longitudinal wall and forming with the transverse walls a plurality of ice cube cells, a base member having an elongated opening and secured to the bottoms of the transverse walls.

13. In an ice cube pan, a grid member having limited upward movement in the pan, means for limiting movement of the grid member to a predetermined height above the bottom of the pan, and means for causing relative movement between the grid member and the pan whereby ice cubes will be broken loose from the grid member and the pan.

14. In an ice cube pan, a plurality of grid members movable relative to each other and to the pan, one of the grid members having an extension, a lever pivotally connected to one end of the other grid member and adapted to be rocked for fulcruming on one end of the pan for raising both grids slightly above the bottom of the pan for forcing the cubes free of the side walls of the pan, said extension adapted to be engaged by the lever as a fulcrum so that further rocking movement of said lever will retain the first grid member stationary while the other grid member is forced away from the first grid member for breaking the cubes from the grid member.

15. In an ice cube pan having inclined side walls, a grid member movable relative to the pan and dividing the pan into a plurality of ice cube molds, means for causing the pan and grid member to be moved relative to each other, the lower edge of the grid member having laterally disposed tapered flanges for not only aiding in raising the cubes but for causing a lateral shifting of the cubes towards the inclined side walls of the pan, the flanges having substantially the width of a mold.

16. In an ice cube pan having inclined side walls, a plurality of grid members nested in each other and movable relative to each other and to the pan, the lower portion of one of the grid members having laterally disposed inclined surfaces on its opposite faces for not only creating a lifting effect on the cubes when said grid member is elevated but for causing a lateral shifting of the cubes towards the inclined side walls, said inclined surfaces having substantially the width of the cube, means for moving the grid members relative to the pan, and the first-mentioned grid relative to the other grid for releasing the cubes frozen in the pan.

17. In an ice cube pan, a plurality of grid members nested in each other, a lever pivotally connected to one grid member and adapted to engage one end of the pan for raising both grid members in the pan sufficiently above the bottom of the pan to break the cubes loose from the side walls of the pan, the other grid member having an extension adapted to be engaged by the lever after the said grid member has been raised for retaining the said grid member against movement while the first mentioned grid member is moved away from the second mentioned grid member for breaking the cubes loose from said grid members.

MICHAEL K. BUCHANAN.
ALBERT G. HORTON.